United States Patent
Carpentier et al.

(10) Patent No.: US 12,054,205 B2
(45) Date of Patent: Aug. 6, 2024

(54) METHOD FOR THE CONTROL OF A POWER STEERING SYSTEM, COMPRISING A FIRST DRIVE AND A SECOND DRIVE AND IMPLEMENTING AN EVALUATION AND REGULATION STEP

(71) Applicant: JTEKT EUROPE, Irigny (FR)

(72) Inventors: Guillaume Carpentier, Oullins (FR); Bertrand Perret, Chabaniere (FR)

(73) Assignee: JTEKT EUROPE, Irigny (FR)

( * ) Notice: Subject to any disclaimer, the term of this patent is extended or adjusted under 35 U.S.C. 154(b) by 401 days.

(21) Appl. No.: 17/427,188

(22) PCT Filed: Jan. 29, 2020

(86) PCT No.: PCT/FR2020/050136
§ 371 (c)(1),
(2) Date: Jul. 30, 2021

(87) PCT Pub. No.: WO2020/157431
PCT Pub. Date: Aug. 6, 2020

(65) Prior Publication Data
US 2022/0126911 A1    Apr. 28, 2022

(30) Foreign Application Priority Data
Feb. 1, 2019 (FR) ..................... 19/01007

(51) Int. Cl.
B62D 5/04 (2006.01)
(52) U.S. Cl.
CPC ......... B62D 5/0463 (2013.01); B62D 5/0421 (2013.01); B62D 5/0484 (2013.01)

(58) Field of Classification Search
CPC .. B62D 5/0463; B62D 5/0421; B62D 5/0484; B62D 5/0481; B62D 5/046; B62D 5/0403
See application file for complete search history.

(56) References Cited

U.S. PATENT DOCUMENTS

| | | | |
|---|---|---|---|
| 2004/0128042 A1 * | 7/2004 | Takahashi | B62D 5/003 5/403 |
| 2005/0087390 A1 | 4/2005 | Furumi et al. | |
| 2016/0090119 A1 * | 3/2016 | Tomizawa | B62D 5/04 5/466 |

FOREIGN PATENT DOCUMENTS

| | | | | |
|---|---|---|---|---|
| DE | 102017221685 A1 * | 6/2018 | | F16H 59/14 |
| JP | 4737058 B2 * | 12/2006 | | B60L 7/18 |

OTHER PUBLICATIONS

Jun. 2, 2020 International Search Report issued in International Patent Application No. PCT/FR2020/050136.

* cited by examiner

*Primary Examiner* — Anne Marie Antonucci
*Assistant Examiner* — Kirsten Jade M Santos
(74) *Attorney, Agent, or Firm* — Oliff PLC

(57) ABSTRACT

A method for the control of a power steering system includes a first drive and a second drive which are arranged in parallel and implement an evaluation and regulation step calculating the first compensation request and the second compensation request as a function of the first deviation and of the second deviation.

9 Claims, 6 Drawing Sheets

METHOD FOR THE CONTROL OF A POWER STEERING SYSTEM, COMPRISING A FIRST DRIVE AND A SECOND DRIVE AND IMPLEMENTING AN EVALUATION AND REGULATION STEP

The invention concerns the field of power steering systems and more particularly a method for controlling a power steering system.

The aim of a power steering system of a vehicle is to allow a driver, or a computer in the case of autonomous vehicles, to control a trajectory of the vehicle by modifying an angle of orientation of the wheels of the vehicle.

For this, the electric power steering system comprises at least one control motor exerting a torque on a rack and/or on a steering wheel.

Generally, the control motor is an electric motor called «brushless». The control motor receives as input a target torque to be exerted, that is to say a torque setpoint, and applies an exerted torque corresponding to a physical torque on the rack or on the steering wheel.

In the remainder of the description, and for ease of reading, the term «torque» is assimilated to a torque setpoint value. Only the terms «exerted torque» and «motor torque» represent a physical torque or the value of said physical torque.

The at least one control motor is an element of the power steering system making it possible to guarantee the trajectory of the vehicle. Thus, the safety of the occupants of the vehicle is linked to proper operation of the control engine.

In order to meet the safety requirement of the steering system, it is customary to install a control motor provided with two distinct motorizations, that is to say a first motorization and a second segregated motorization, both motorizations being autonomous, and disposed in parallel, each motorization having its own power supply, receiving as input a target motor torque to be exerted, corresponding to a fraction of the target torque, and applying a motor torque. The motorizations can operate independently, and/or simultaneously.

In the event of a permanent degradation considered to be of a safety nature of one of the two motorizations, that is to say a significant deterioration calling into question the safety of the steering system such as, for example, a total failure of one of the two motorizations, the second motorization receives as input a target motor torque equal to the target torque until the faulty motorization is repaired.

When the two motorizations are deemed to be functional, an optimized operation of the control motor is guaranteed both on energy consumption and on minimization of vibrations, by distributing the target torque on the two motorizations. The two motorizations receive a fraction of the target torque as input. The two motorizations then operate simultaneously so that their overall behavior is comparable to a single motorization. The two motorizations each ensure delivery of a motor torque whose sum is equal to the exerted torque and corresponds substantially to the target torque.

Generally, the motor torque is substantially equal to the target motor torque. However, the torque produced by the motorization may present a difference with respect to the target motor torque. This difference does not call into question its overall operation but limits the maximum motor torque that can be exerted by said motorization.

This difference can be a systematic difference or a punctual difference.

A systematic difference is inherent in a design of the two motorizations. The two motorizations have identical elements or use the same technology and will therefore in some cases have a difference between the motor torque and the requested setpoint, that is to say the target motor torque, wholly or partly identical.

A systematic difference affecting both motorizations at the same time can, for example, appear during a prolonged or repeated parking maneuver. In fact, during the parking maneuver, the motorizations will be subjected to strong stresses increasing their inner temperature; as their cooling capacity is limited, their maximum motor torque must be reduced to avoid permanent damage.

A systematic difference affecting the two motorizations at the same time can also, for example, be linked to the technology of the motorizations. Indeed, transmitting and receiving a target motor torque and physically applying it is not instantaneous, that is to say there is an application delay. In a power steering system, this application delay, which is materialized at an instant t by a systematic difference, is in the range of 10 ms.

A punctual difference is a difference affecting only a motorization, such as for example a degradation of an element of a control chain or an input of this control chain, for example an electric power supply of the motorization. It can be noted that the mechanisms for detecting a permanent degradation are, by design, never predictive: a permanent degradation of the control chain will therefore, before being considered as such, be considered as a punctual difference.

Thus, the engine affected by a difference is deemed to be functional but may not deliver the motor torque expected at a given time. The motor torque is therefore different from the target motor torque. The sum of the motor torques of the two motorizations is different from the target torque. The target torque is therefore not fully exercised.

In order to ensure redundancy of the two motorizations, and therefore in order to ensure that the target torque is fully exerted as much as possible at a given instant, it is known practice to perform a compensation function between the two motorizations.

The compensation function can be of the «master-slave» type, that is to say that the compensation function can only be done in one direction at a time and determines, by means of signals external to the motorizations such as for example a voltage of a supply current of each motorization, or an inner temperature of each motorization, the motorization being able to produce the greatest motor torque and therefore the direction of the compensation. This motorization will be referred to hereinafter as the slave motorization. Conversely, the motorization that can produce the least important motor torque is called the master motorization. The compensation function then determines the part of the target motor torque not achieved by the master motorization; this part of the target motor torque is then added by the compensation function to the target motor torque of the slave motorization. In this way, the torque produced by the slave motorization compensates for the torque produced by the master motorization. The target torque is totally produced.

This «master-slave» type compensation function is not entirely satisfactory, because if a punctual difference appears on the slave motorization, the master motorization will not compensate for it. However, the compensation function determines the master motorization and the slave motorization in an imprecise and/or very complex manner by means of a large number of external signals, and in certain cases leads to poor use of the potential of the two motorizations.

In order to overcome the above drawbacks, a «double» type compensation function is also known as illustrated in FIG. 1. This compensation function defines, during a distribution step D'a, that each motorization must achieve a distributed torque 2'a, 2"a having a value equal to a fraction of the target torque 1a, then the compensation function calculates for each motorization a difference 5'a, 5"a between the target motor torque 3'a, 3"a and an estimated motor torque. The estimated motor torque is close to the motor torque 4'a, 4"a. However, the estimated motor torque differs from the motor torque by a few fixes and errors. In order to facilitate the understanding of the invention, the estimated motor torque will be merged with the motor torque 4'a, 4"a in the remainder of the description. This difference 5'a, 5"a will subsequently correspond to a compensation request from the first motorization to the second motorization, or vice versa. Finally, the compensation function adds the compensation request 5'a calculated for the first motorization to the distributed torque 2"a of the second motorization and vice versa, that is to say the compensation request 5"a calculated for the second motorization with distributed torque 2'a of the first motorization. In this way, each motorization compensates for the difference 5'a, 5"a of the other motorization.

For example, in the case of an optimal operation of each motorization, the target motor torque 3'a, 3"a of each motorization is equal to the distributed torque 2'a, 2"a. Each motorization then produces a motor torque 4'a, 4"a equal to the target motor torque 3'a, 3"a. The compensation request 5'a, 5"a between the first motorization and the second motorization, or vice versa, is zero.

According to another example, in the event of the presence of a punctual difference on the first motorization, for example, the motor torque 4'a is different from the target motor torque 3'a. The compensation request 5'a calculated for the first motorization is therefore different from 0. The compensation request 5'a is therefore added to the distributed torque 2"a of the second motorization. The target motor torque of the second motorization is therefore equal to the distributed torque 2"a increased by the compensation request 5'a. The second motorization then achieves a motor torque equal to the distributed torque 2"a increased by the compensation request 5'a.

This «double» type compensation function is more precise and more efficient than the «master-slave» type compensation function in the situations described above, because it makes it possible to compensate for the specific differences of each motorization in both directions.

However, in the case of the presence of a systematic difference, the first motorization will not provide at an instant t the expected motor torque 4'a and will send a compensation request 5'a to the second engine and the second engine will not provide the expected motor torque 4"a and will send a compensation request 5"a to the first motorization.

More precisely, a scheduling of the compensation function causes that the compensation request 5'a, 5"a calculated at time t is applied at a time t+1, that is to say that there is a shift time between the determination of the compensation request 5'a, 5"a and its taking into account by the other motorization. The difference corresponds to the delay of a scheduling task, or approximately 1 ms.

Thus, at time t+1, each motorization receives a target motor torque 3'a, 3"a equal to the distributed torque 2'a, 2"a, which the motorization cannot achieve, increased by the compensation request 5'a, 5"a. The difference between the motor torque and the target motor torque increases with respect to time t. Therefore, the first motorization will send a compensation request 5'a to the second motorization which is greater than the compensation request determined at time t, and the second motorization will also send a compensation request 5"a to the first motorization greater than the determined request at time t. These compensation requests 5'a, 5"a will be taken into account at time t+2.

As long as the motorizations receive a distributed torque 2'a, 2"a that they cannot achieve, the compensation request 5'a, 5"a increases.

Thus, at time t+x, x being a natural integer, each motorization receives a target motor torque 3'a, 3"a equal to the distributed torque 2'a, 2"a, that the motorizations can achieve, increased by the compensation request 5'a, 5"a calculated at time t+x−1. The motorizations then provide an exerted torque 6a greater than the desired target torque 1a. This is a rebound phenomenon causing instability of the «double» type compensation function.

Furthermore, the compensations of the «double» or «Master-slave» type have the characteristic of compensating for all or part of the systematic differences, which is not the case for a single motorization. This compensation of all or part of the systematic differences generates an uncontrolled difference in behavior between a single-motorization system presenting by definition systematic differences, and a system composed of two motorizations with compensation.

The aim of the invention is to remedy all or part of the aforementioned drawbacks by proposing a compensation function of the «double» type minimizing the compensation request 5'a, 5"a requested from each motorization as a function of the systematic differences presented by the two control motorizations.

The subject of the invention is a method for controlling a power steering system, comprising a first motorization and a second motorization arranged in parallel, said control method implementing:

a distributing step determining a first distributed torque, and a second torque distributed from a target torque, a determining step adding a first compensation request to the first distributed torque so as to determine a first target motor torque, and adding a second compensation request to the second distributed torque so as to determine a second target motor torque, an implementing step in which the first motorization exerts a first motor torque depending on the first target motor torque, and the second motorization exerts a second motor torque depending on the second target motor torque, a compensating step calculating a first difference as a function of the first motor torque and of the first target motor torque, and calculating a second difference as a function of the second motor torque and of the second target motor torque, characterized in that the control method implements an evaluation and regulation step by calculating the first compensation request and the second compensation request as a function of the first difference and the second difference.

The control method according to the invention seeks to distinguish a fraction of the first difference and of the second difference which is systematically generated, that is to say generated by a systematic difference, and a fraction of the first difference and of the second difference which is punctually generated, that is to say by a punctual difference, so that only the fraction of the first difference and of the second difference which is generated by a punctual fault is the subject of the first compensation request and of the second compensation request.

In fact, the applicant has understood that the drawbacks of the «double» and «master-slave» type compensation functions of the state of the art are linked so that the first compensation request and the second compensation request seek to erase without distinction the punctual differences but also the systematic differences. In other words, in the state of the art, the compensation function seeks that a difference between the target torque and an exerted torque, corresponding to the sum of the first motor torque and of the second motor torque, is zero without distinction whether the difference is punctual or systematic.

A systematic difference applies to both motorizations or corresponds to an intrinsic element normal to the motorization. Thus, a systematic torque difference detected on a motorization is by definition also detected on the other motorization. If this difference is compensable and compensated, the behavior of the two combined motorizations is very different from the behavior of a single motorization. If this torque difference is not compensated, or compensable at an instant t, this therefore causes the rebound phenomenon discussed above.

The control method according to the invention makes it possible, thanks to the evaluation and regulation step, to guarantee a good level of precision by using only the first difference and the second difference to determine the fraction of the difference to be compensated, that is to say the fraction of the difference linked to a punctual difference corresponding to the compensation request.

According to one characteristic of the invention, the compensation step calculates the first difference by subtracting the first motor torque and the first target motor torque, and calculates a second difference by subtracting the second motor torque and the second target motor torque According to one characteristic of the invention, the evaluation and regulation step minimizes a sum of the first compensation request, of the second compensation request, of the first difference, of the second difference and of a residue.

The residue corresponds to the fraction, of the first difference and of the second difference, generated systematically, that is to say by a systematic difference. In other words, the residue corresponds to the difference which will not be compensated for between the target torque and the exerted torque. Thus, the method according to the invention allows that a difference between the target torque and the exerted torque is not compensated. In this way, the method distinguishes systematic differences from punctual differences.

The residue is adjustable.

According to one characteristic of the invention, the evaluation and regulation step performs a quadratic minimization of the sum.

Thus an analytical solution is obtained of the difference between the target torque and the exerted torque making it possible to determine the first compensation request and the second compensation request.

According to one characteristic of the invention, the evaluation and regulation step calculates that the second compensation request is equal to the second difference minus the first difference, and that the first compensation request is equal to 0, when the symbol of the first difference and the symbol of the second difference are identical and that the absolute value of the first difference is greater than the absolute value of the second difference.

According to one characteristic of the invention, the evaluation and regulation step calculates that the second compensation request is equal to 0, and that the first compensation request is equal to the first difference minus the second difference, when the symbol of the first difference and the symbol of the second difference are identical and that the absolute value of the first difference is less than the absolute value of the second difference.

According to one characteristic of the invention, the evaluation and regulation step calculates that the second compensation request is equal to the opposite of the sum of the first difference and of the second difference, and that the first compensation request is equal at 0, when the symbol of the first difference and the symbol of the second difference are different and the absolute value of the first difference is greater than the absolute value of the second difference.

According to one characteristic of the invention, the evaluation and regulation step calculates that the second compensation request is equal to 0, and that the first compensation request is equal to the opposite of the sum of the first difference and the second difference, when the symbol of the first difference and the symbol of the second difference are different and the absolute value of the first difference is less than the absolute value of the second difference.

Thus an empirical solution of the difference between the target torque and the exerted torque is obtained making it possible to determine the first compensation request and the second compensation request.

The empirical solution gives results close to the analytical solution and is easier to implement.

According to one characteristic of the invention, the evaluation and regulation step calculates a value of the first compensation request and a value of the second compensation request over a time interval as a function of a value of the first calculated difference by the compensation step at a first instant preceding the time interval and by a value of the second difference calculated by the compensation step at a second instant preceding the time interval.

The control method according to the invention implements a control loop over a succession of time intervals. The compensation step is an open loop on the first compensation request and on the second compensation request. According to one characteristic of the invention, the first instant and the second instant are comprised in the same time interval.

The invention will be better understood, thanks to the description below, which relates to an embodiment according to the present invention, given by way of non-limiting example and explained with reference to the appended schematic drawings, in which.

The invention concerns a method 100 for controlling a power steering system 1 for a vehicle 2, and more particularly for a motor vehicle 2 intended for transporting people.

Figure 11:
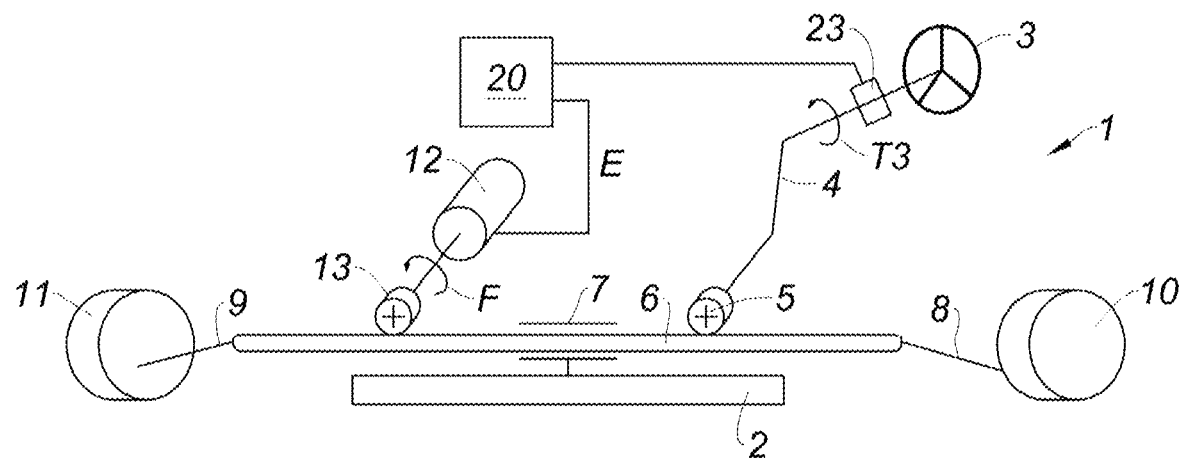
FIG. 11 is a representation of a power steering system of a vehicle.

In a manner known per se, and as can be seen in FIG. 11, said power steering system 1 comprises a steering wheel 3 which allows a driver to maneuver said power steering system 1 by exerting a force, called «steering wheel torque» T3, on said steering wheel 3.

Said steering wheel 3 is mounted on a steering column 4, guided in rotation on the vehicle 2, and which meshes, by means of a steering pinion 5, on a rack 6, which is itself guided in translation in a steering casing 7 fixed to said vehicle 2.

The control method 100 according to the invention could also be applied in a steering system not comprising a mechanical link between the steering wheel 3 and the rack 6. This type of steering system is also called «steer by wire».

Preferably, the ends of said rack 6 are each connected to a steering tie-rod 8, 9 connected to the knuckle holder of a steering wheel 10, 11 (respectively a left wheel 10 and a right wheel 11), so that the longitudinal translational displacement of the rack 6 makes it possible to modify the steering angle (yaw angle) of the steered wheels.

The steered wheels 10, 11 can moreover preferably also be driving wheels.

The power steering system 1 also comprises a control motor 12 intended to supply an exerted torque F to assist the maneuvering of said power steering system 1.

The exerted torque F is determined by a computer 20 which determines in particular from the flywheel torque T3 measured by means of the sensor 23, a target torque E.

The control motor 12 can engage, where appropriate via a gear type reducer, either on the steering column 4 itself, to form a so-called «single pinion» mechanism, or directly on the rack 6, for example by means of a second pinion 13 distinct from the steering pinion 5 which allows the steering column 4 to mesh with the rack 6, so as to form a so-called «double pinion» mechanism, as illustrated in FIG. 11, or even by means of a ball screw which cooperates with a corresponding thread of said rack 6, at a distance from said steering pinion 5.

The control motor 12 is preferably an electric motor, with two operating directions, and preferably a rotary electric motor, of the brushless type. Furthermore, in order to meet the safety requirement of the steering system 1, the control motor 12 is provided with two distinct motorizations, that is to say a first motorization M1 and a second motorization M2, as represented in FIG. 2, positioned in parallel.

The first motorization M1 is independent from the second motorization M2. It receives as input a first target motor torque E1 to be exerted and applies a first motor torque F1 on the rack 6.

The second motorization M2 is independent from the first motorization M1. It receives as input a second target motor torque E2 to be exerted and applies a second motor torque F2 to the rack 6.

Figure 1:
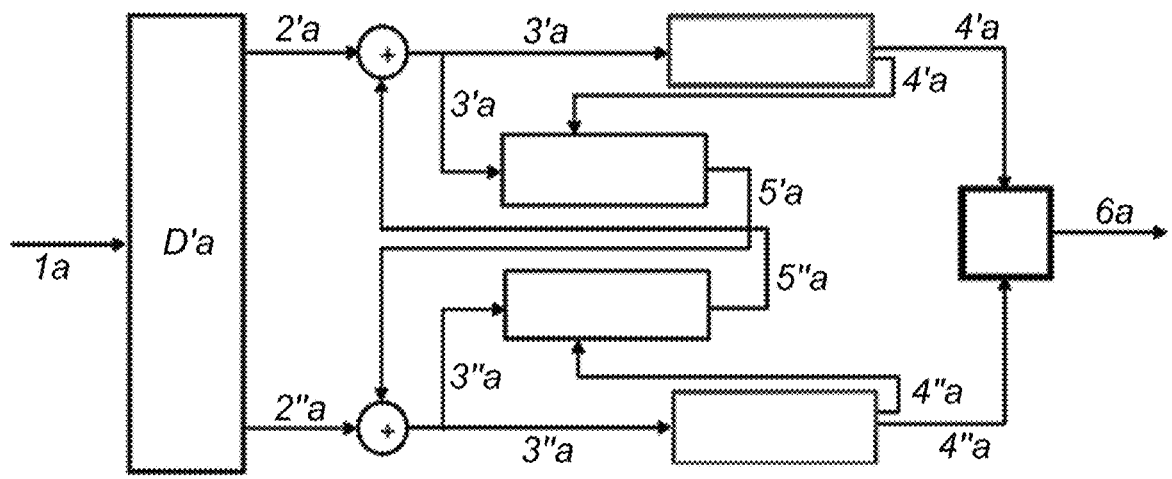
FIG. 1 is a schematic representation of a control method according to the state of the art.
Figure 2:
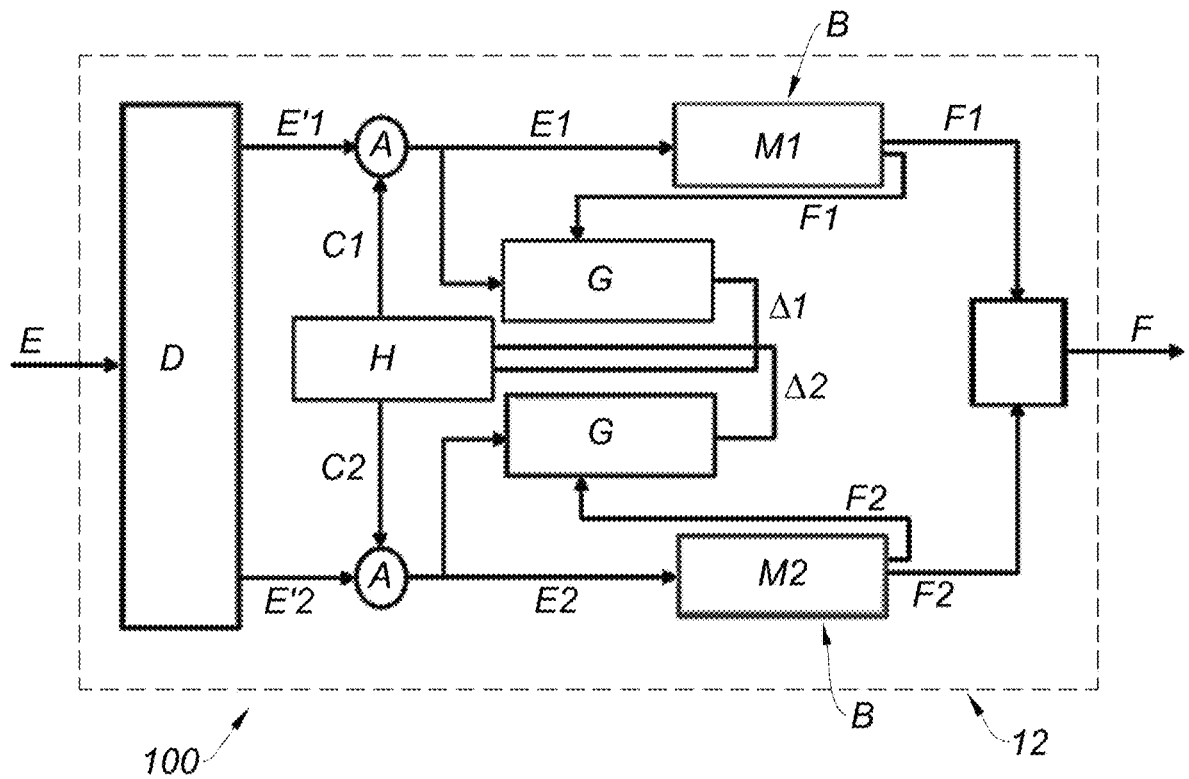
FIG. 2 is a schematic representation of a control method according to the invention.

The control method 100 according to the invention implements steps D, A, B, G, H which are schematically represented in FIG. 2.

More precisely, the control method 100 comprises a distribution step D. This distribution step D distributes the target torque E over each of the motorizations M1, M2.

More precisely, the distribution step D determines a first distributed torque E'1 which is intended to be applied by the first motorization M1 on the rack 6 and a second distributed torque E'2 which is intended to be applied by the second motorization M2 on the rack 6. Preferably, and in the absence of a failure of one of the motorization M1, M2, the distribution step determines that:

$$E'1+E'2=E \qquad [\text{Math 1}]$$

Where $$E'1=x1*E \qquad [\text{Math 2}]$$

and $$E'2=(1-x1)*E \qquad [\text{Math 3}]$$

with x1 comprised between 0 and 1

The control method 100 according to the invention also comprises a determining step A adding a first compensation request C1 to the first distributed torque E'1 so as to determine the first target motor torque E1, and adding a second compensation request C2 to the second distributed torque E'2 so as to determine the second target motor torque E2.

The control method 100 according to the invention then comprises an implementation step B in which the first motorization M1 exerts the first motor torque F1 depending on the first target motor torque E1, and the second motorization M2 exerts the second motor torque F2 depending on the second target motor torque E2.

A design of the motorizations M1, M2 determines a reactivity time corresponding to the time necessary for the motorization M1, M2 to exert a requested torque. In other words, if the motorization M1, M2 receives a torque of x N·m as input, with x a positive decimal number, the reactivity time is necessary for the motorization to exert a torque of x N·m. Before this reactivity time has elapsed, the motorization exerts a torque lower than x N·m. This is a normal effect of internal regulation of the motorization making it possible to ensure a compromise between stability and reactivity.

The reactivity time implies that a time interval shorter than the reactivity time, the motorization M1, M2 does not produce the target motor torque E1, E2. In other words, at a time interval shorter than the reactivity time, the motor torque F1, F2 is different from the target motor torque E1, E2.

Subsequently, when a motorization M1, M2 does not achieve the target motor torque E1, E2, it will be said that there is a difference on the motorization M1, M2.

More precisely, we will say that there is a systematic difference when the difference is linked to an intrinsic element normal to the motorization M1, M2 such as the reactivity time or when the difference affects the two motorizations M1, M2 at the same instant, such as temperature. It will be said that there is a punctual difference when the difference only affects a motorization M1, M2 such as a degradation of an element of a control chain.

Thus when a motorization M1, M2 does not achieve the target motor torque E1, E2, there is a difference induced by said motorization M1, M2, the difference possibly being composed of a systematic difference and a punctual difference.

The sum of the first motor torque F1 and of the second motor torque F2 corresponds substantially to the torque exerted F by the control motor 12 except for friction and inertia phenomena.

Finally, the control method 100 also implements a compensation step G. The compensation step G receives a first estimated motor torque which is substantially equal to the first motor torque F1. The first estimated motor torque differs from the first motor torque F1 by some fixes and errors. In order to facilitate the understanding of the invention, the first estimated motor torque will be merged with the first motor torque F1 in the remainder of the description.

The compensation step G calculates a first difference Δ1 as a function of the first motor torque F1 and of the first target motor torque E1. The first difference Δ1 thus represents part of the first target motor torque not produced by the first motorization M1, also hereinafter called the first disturbance torque D1.

The compensation step G also receives a second estimated motor torque which is substantially equal to the second motor torque F2. The second estimated motor torque differs from the second motor torque F2 by some corrections and errors. In order to facilitate the understanding of the invention, the second estimated motor torque will be merged with the second motor torque F2 in the remainder of the description.

The compensation step G calculates a second difference Δ2 as a function of the second motor torque F2 and the second target motor torque E2. The second difference Δ2 thus represents a part of the second target motor torque not produced by the second motorization M2, also hereinafter called the second disturbance torque D2.

The first difference Δ1 and the second difference Δ2 represent the difference between the exerted torque F and the target torque E, that is to say the value of a disturbance applied to the control motor 12. In order to obtain an exerted torque F close to the target torque E, the sum of the first difference Δ1 and of the second difference Δ2 must be as small as possible. In other words:

$$E = F + \Delta 1 + \Delta 2 \qquad \text{[Math 4]}$$

However, the first difference Δ1 and the second difference Δ2 represent a difference which is the sum of a punctual difference and a systematic difference. Yet, in order to preserve the stability of the control method, only the fraction of the difference linked to a punctual difference of a motorization M1, M2 must be compensated by the other motorization M1, M2.

Thus, the control method 100 implements an evaluation and regulation step H. The evaluation and regulation step H determines by means of the first difference Δ1 and the second difference Δ2, the first compensation request C1 and the second compensation request C2, representing the fraction of the difference linked to a punctual difference.

Figure 3:
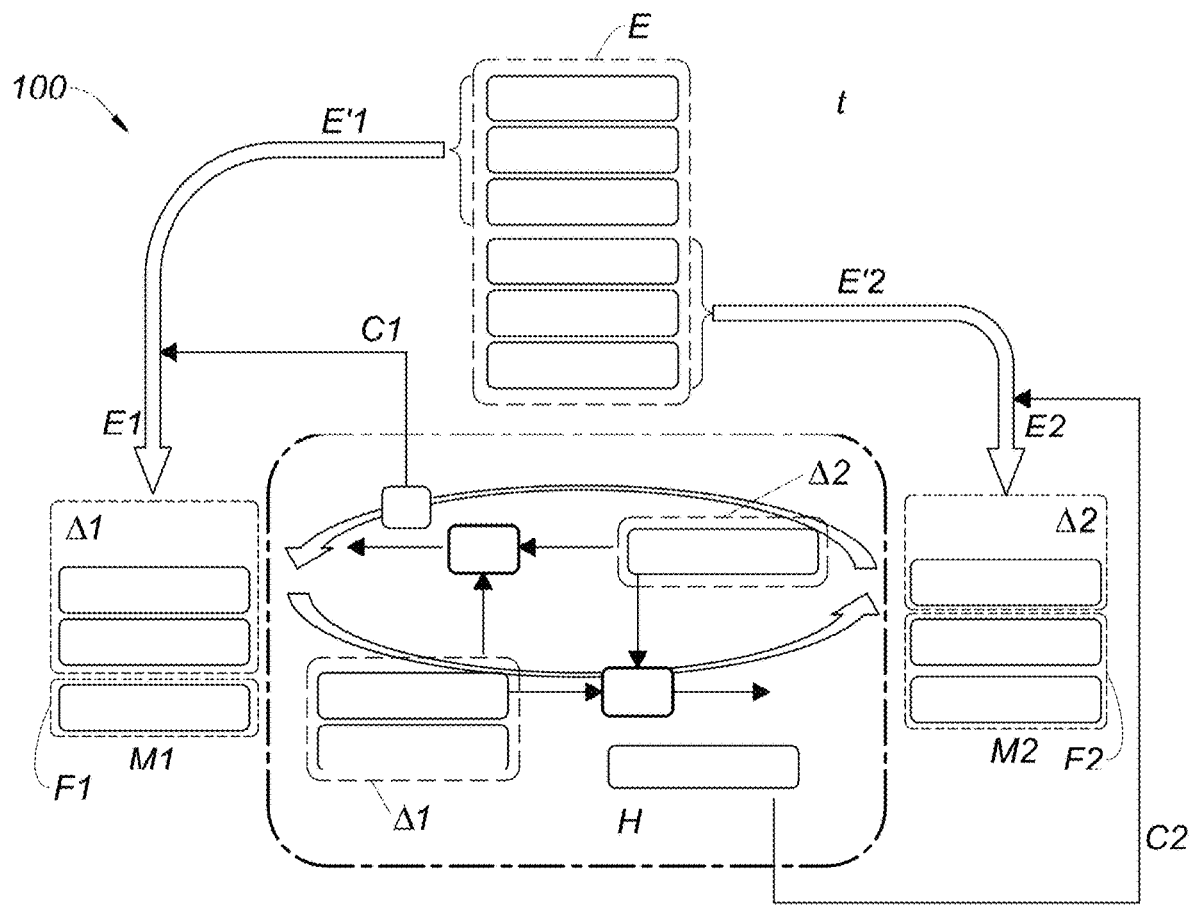
FIG. 3 is a schematic representation of the control method according to the invention at a time interval.

An example of the control method at a time interval t is illustrated in FIG. 3. In FIG. 3, at the time interval t, the target torque E is equal to 6 N·m. The distribution step D determines that the first distributed torque E'1 is equal to 3 N·m and that the second distributed torque E'2 is equal to 3 N·m.

The first compensation request C1 and the second compensation request C2, calculated at a time interval t−1 and applied to the time interval t, are zero.

More precisely, the first compensation request C1 and the second compensation request C2, used by the determination step A at the time interval t, were calculated as a function of a value of the first difference Δ1 calculated by the compensation step H at a first instant preceding the time interval t and by a value of the second difference Δ2 calculated by the compensation step H at a second instant preceding the time interval t.

Thus, the first target motor torque E1 is equal to 3 N·m and the second target motor torque E2 is equal to 3 N·m.

The first motorization M1 has a difference and thus produces, during the production step B, a first motor torque F1 of 1 N·m instead of 3 N·m as requested.

The compensation step G therefore calculates, at the time interval t, that the first difference Δ1 is equal to 2 N·m.

The second motorization M2 also exhibits a difference and thus produces, during the production step B, a second motor torque F2 of 2 N·m instead of 3 N·m as requested. The compensation step G therefore calculates, at the time interval t that the second difference Δ2 is equal to 1 N·m.

The control method 100 then comprises an evaluation and regulation step H which determines the first compensation request C1 and the second compensation request C2 which will be applied to the time interval t+1.

The first compensation request C1 and the second compensation request C2, calculated at a time interval t, as a function of the first difference Δ1 calculated at a first instant preceding the time interval t+1 and of the second difference Δ2 calculated at a second instant preceding the time interval t+1, applied at the time interval t+1.

Figure 4:
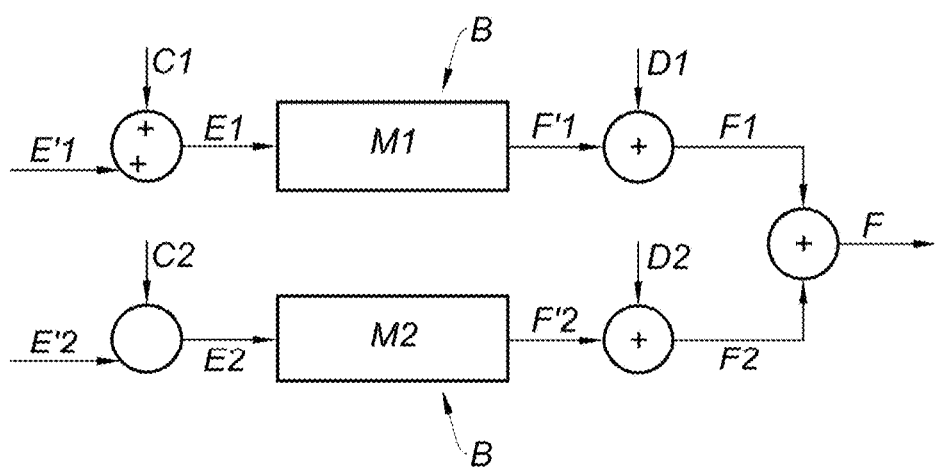
FIG. 4 is a simplified representation of the control method according to the invention.

The evaluation and regulation step H calculating the first compensation request C1 and the second compensation request C2 as a function of the first difference Δ1 and of the second difference Δ2 is more precisely described by relying on the simplified representation of the control method 100 of FIG. 4.

In the simplified representation, during the implementation step B, the first motorization M1 exerts a first ideal motor torque F'1 which is equal to the first target motor torque E1, and the second motorization exerts a second ideal motor torque F'2 which is equal to the second target motor torque E2.

However, the first motorization M1 receives a first disturbance torque D1 which corresponds to the first difference Δ1. Thus, the sum of the first ideal motor torque F'1 and of the first disturbance torque D1 is equal to the first motor torque F1. In other words, the first disturbance torque D1 represents the torque not produced by the first motorization M1 because of a punctual or systematic difference, applied to the first motorization.

Furthermore, the second motorization M2 receives a second disturbance torque D2 which corresponds to the second difference Δ2. Thus, the sum of the second ideal motor torque F'2 and of the second disturbance torque D2 is equal to the second motor torque F2. In other words, the second disturbance torque D2 represents the torque not produced by the second motorization M2 because of a punctual or systematic difference, applied to the second motorization.

The control method 100 seeks that the exerted torque F, equal to the sum of the first motor torque F1 and of the second motor torque F2, is close to the target torque E, corresponding to the sum of the first distributed torque E'1 and of the second distributed torque E'2.

More precisely, the control method 100 seeks to compensate for a fraction of the first disturbance torque D1 and a fraction of the second disturbance torque D2 linked to a punctual difference, and not a fraction of the first disturbance torque D1 and a fraction of the second torque disturbance D2 linked to a systematic difference. Thus, the control method 100 allows the first compensation request C1 and the second compensation request C2 to be different from the first disturbance torque D1 and the second disturbance torque D2. The control method 100 allows a residue R such that $$F+R=E \quad \text{[Math 5]}$$

Thus, from the simplified representation of FIG. 4, the control method 100 seeks:

$$\min_{C1,C2} \|F - (E'1 + E'2) - R\| \leftrightarrow \min_{C1,C2} \|C1 + C2 + D1 + D2 - R\| \quad \text{[Math 6]}$$

Thus, the control method 100 solves the equation:

$$C1^* + C2^* + D1 + D2 = R^* \quad \text{[Math 7]}$$

With C1* the optimal value corresponding to C1, C2* the optimal value corresponding to C2 and R* the optimal value corresponding to R.

The solution to the equation Math 7 can also be written, with α1, α2, α3, and α4 belonging to the set of reals:

$$\begin{cases} C1^* = \alpha 1.D1 + \alpha 2.D2 \\ C2^* = \alpha 3.D1 + \alpha 4.D2 \\ R^* = (-1 - \alpha 1 - \alpha 3).D1 + (-1 - \alpha 2 - \alpha 4).D2 \end{cases} \quad \text{[Math 8]}$$

The equation Math 8 can be written:

$$T = M(\alpha).\Delta \quad \text{[Math 9]}$$

With:

$$T = \begin{pmatrix} C1 \\ C2 \\ R \end{pmatrix} \quad \text{[Math 10]}$$

$$M(\alpha) = \begin{pmatrix} \alpha 1 & \alpha 2 \\ \alpha 3 & \alpha 4 \\ -1-\alpha 1-\alpha 3 & -1-\alpha 2-\alpha 4 \end{pmatrix} \quad \text{[Math 11]}$$

$$\Delta = \begin{pmatrix} D1 \\ D2 \end{pmatrix} \quad \text{[Math 12]}$$

The evaluation and regulation step H can, according to an analytical embodiment, perform a quadratic minimization of the equation Math 9:

$$\min_{\alpha 1, \alpha 2, \alpha 3, \alpha 4} \|T\|s = \min_{\alpha 1, \alpha 2, \alpha 3, \alpha 4} T^T.S.T \quad \text{[Math 13]}$$

With S>0 a weighting matrix

Ultimately, the control method 100 considers a first hypothesis according to which, the first disturbance torque D1, and the second disturbance torque D2 correspond to an image of a production capacity of the first motorization and of the second motorization, that is to say that the less the motorization can produce the requested target motor torque, the greater the disturbance torque will be and the less it will be wished to use said motorization to compensate; the absolute value of the disturbance torque must penalize the compensation request.

The control method 100 also considers a second hypothesis according to which the residue R is adjustable, that is to say that the residue R must be generally low but that it can increase when the first disturbance torque D1 is substantially equal to the second disturbance torque D2; the residue is penalized as a function of the absolute value of the difference between the first disturbance torque D1 and the second disturbance torque D2.

Figure 5:
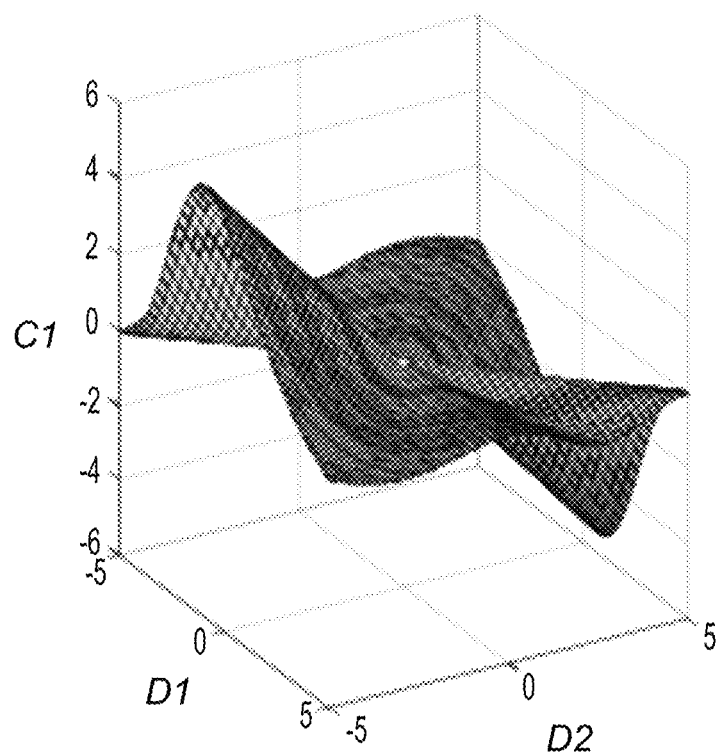
FIG. 5 is a graph representing an analytical solution of a first compensation request as a function of a first disturbance torque and a second disturbance torque.
Figure 6:
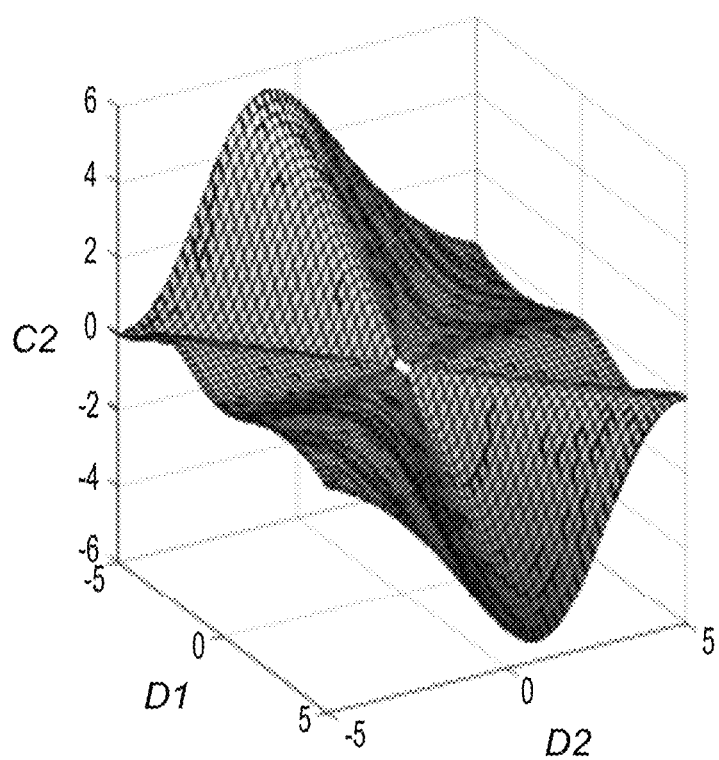
FIG. 6 is a graph representing an analytical solution of a second compensation request as a function of the first disturbance torque and the second disturbance torque.
Figure 7:
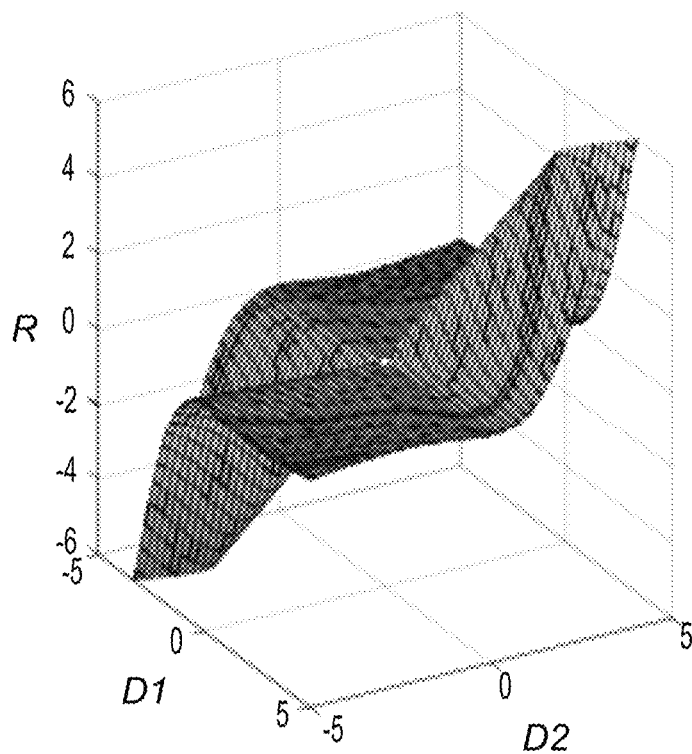
FIG. 7 is a graph representing an analytical solution of a residue as a function of the first disturbance torque and the second disturbance torque.

In the end, analytical solutions represented in FIGS. 5, 6 and 7 are obtained. More precisely, FIG. 5 illustrates an analytical solution of the first compensation request C1 as a function of the first disturbance torque D1 and of the second disturbance torque D2, FIG. 6 illustrates an analytical solution of the second compensation request C2 as a function of the first disturbance torque D1 and of the second disturbance torque D2 and FIG. 7 illustrates an analytical solution of the residue R as a function of the first disturbance torque D1 and the second disturbance torque D2.

The evaluation and regulation step may, according to an empirical embodiment, perform an empirical minimization of the equation Math 9.

In this case, it is determined that:

TABLE 1

| Disturbance torque (D1, D2) | | Compensation torque (C1, C2) | Residue (R) |
|---|---|---|---|
| Symbol (D1) = Symbol (D2) | \|D1\| ≥ \|D2\| | C1 = 0<br>C2 = −D1 + D2 | 2.D2 |
| | \|D1\| ≤ \|D2\| | C1 = −D2 + D1<br>C2 = 0 | 2.D1 |
| Symbol (D1) ≠ Symbol (D2) | \|D1\| ≥ \|D2\| | C1 = 0<br>C2 = −(D1 + D2) | 0 |
| | \|D1\| ≤ \|D2\| | C1 = −(D1 + D2)<br>C2 = 0 | 0 |

Figure 8:
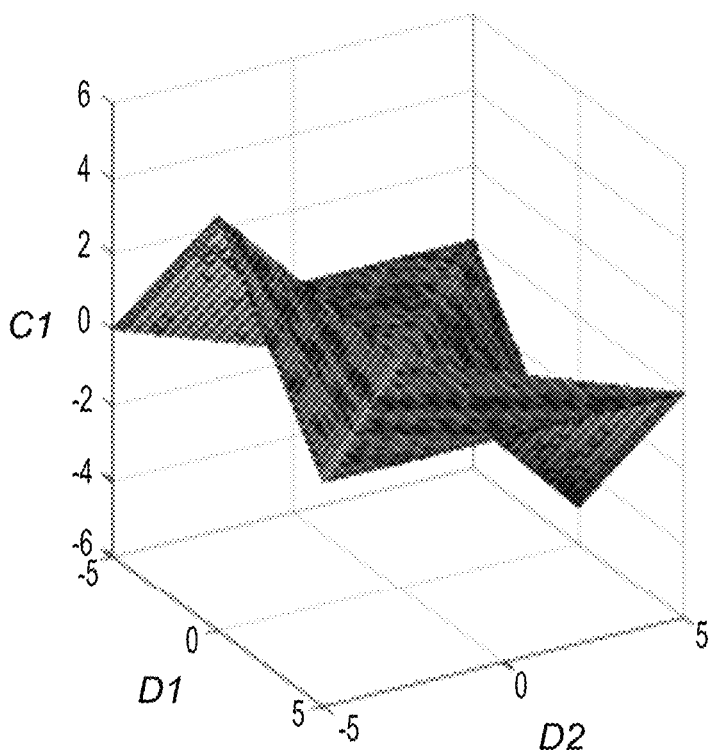
FIG. 8 is a graph representing an empirical solution of the first compensation request as a function of the first disturbance torque and the second disturbance torque.
Figure 9:
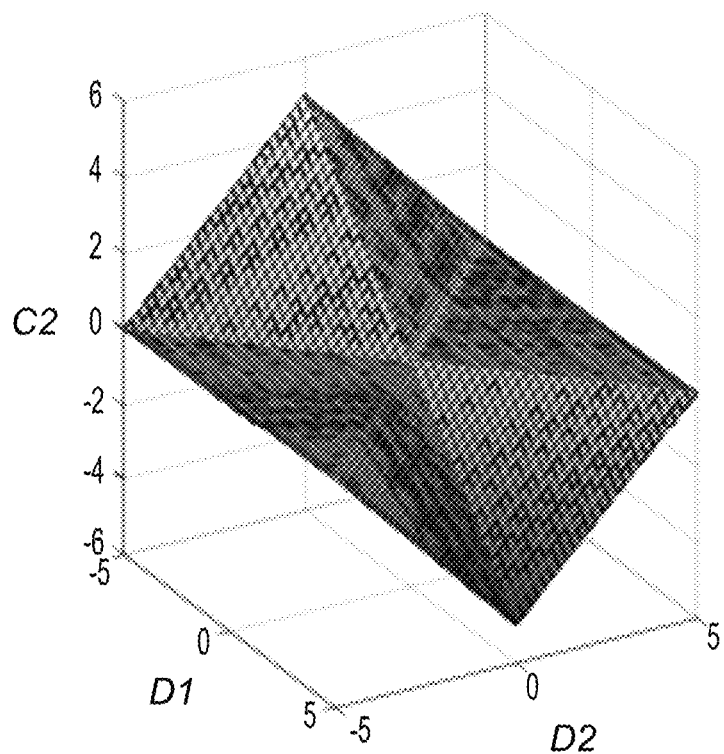
FIG. 9 is a graph representing an empirical solution of the second compensation request as a function of the first disturbance torque and the second disturbance torque.
Figure 10:
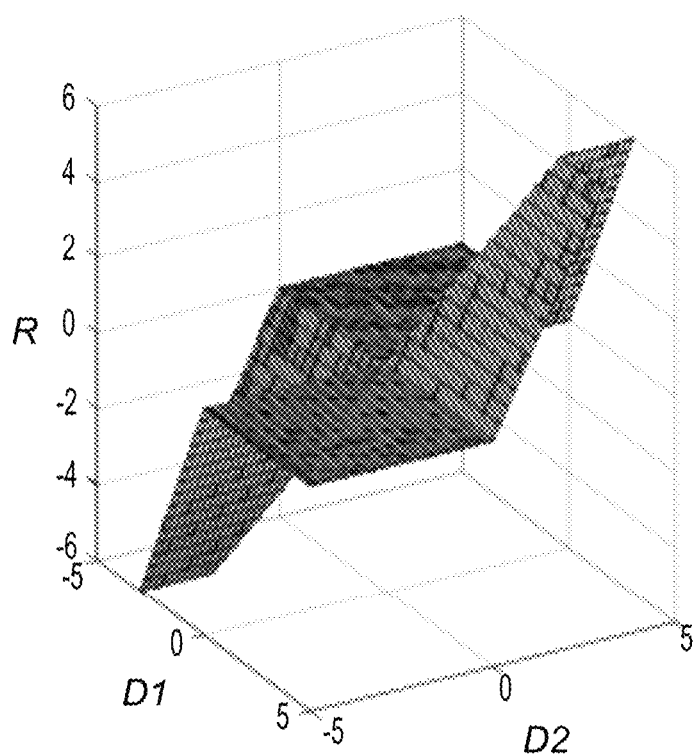
FIG. 10 is a graph representing an empirical solution of the residue as a function of the first disturbance torque and the second disturbance torque.

In the end, empirical solutions represented in FIGS. 8, 9 and 10 are obtained. More specifically, FIG. 8 illustrates an empirical solution of the first compensation request C1 as a function of the first disturbance torque D1 and the second disturbance torque D2, FIG. 9 illustrates an empirical solution of the second compensation request C2 as a function of the first disturbance torque D1 and of the second disturbance torque D2 and FIG. 10 illustrates an empirical solution of the residue R as a function of the first disturbance torque D1 and the second disturbance torque D2.

Of course, the invention is not limited to the embodiments described and represented in the appended figures. Modifications remain possible, in particular from the point of view of the constitution of the various elements or by substitution of technical equivalents, without thereby departing from the scope of protection of the invention.

The invention claimed is:

1. A method for controlling a power steering system, comprising a first motorization and a second motorization arranged in parallel, said control method implementing:
a distributing step determining a first distributed torque, and a second distributed torque from a target torque,
a determining step adding a first compensation request to the first distributed torque so as to determine a first target motor torque, and adding a second compensation request to the second distributed torque so as to determine a second target motor torque,
an implementing step in which the first motorization exerts a first motor torque depending on the first target motor torque, and the second motorization exerts a second motor torque depending on the second target motor torque,
a compensating step calculating a first difference as a function of the first motor torque and of the first target motor torque, and calculating a second difference as a function of the second motor torque and of the second target motor torque, wherein the control method implements an evaluation and regulation step calculating the first compensation request and the second compensation request as a function of the first difference and of the second difference.

2. The control method according to claim 1, wherein the evaluation and regulation step minimizes a sum of the first compensation request, of the second compensation request, of the first difference, of the second difference and of a residue.

3. The control method according to claim 2, wherein the evaluation and regulation step performs a quadratic minimization of the sum.

4. The control method according to claim 2, wherein the evaluation and regulation step calculates that the second compensation request is equal to the second difference minus the first difference, and that the first compensation request is equal to 0, when the symbol of the first difference and the symbol of the second difference are identical and the absolute value of the first difference is greater than the absolute value of the second difference.

5. The control method according to claim 2, wherein the evaluation and regulation step calculates that the second compensation request is equal to 0, and that the first compensation request is equal to the first difference minus the second difference, when the symbol of the first difference and the symbol of the second difference are identical and the absolute value of the first difference is less than the absolute value of the second difference.

6. The control method according to claim 2, wherein the evaluation and regulation step calculates that the second compensation request is equal to the opposite of the sum of the first difference and the second difference, and that the first compensation request is equal to 0, when the symbol of the first difference and the symbol of the second difference are different and that the absolute value of the first difference is greater than the absolute value of the second difference.

7. The control method according to claim 2, wherein the evaluation and regulation step calculates that the second compensation request is equal to 0, and that the first compensation request is equal to the opposite of the sum of the first difference and the second difference, when the symbol of the first difference and the symbol of the second difference are different and that the absolute value of the first difference is less than the absolute value of the second difference.

8. The control method according to claim 1, wherein the evaluation and regulation step calculates a value of the first compensation request and a value of the second compensation request over a time interval as a function of a value of the first difference calculated by the compensation step at a first instant preceding the time interval and of a value of the second difference calculated by the compensation step at a second instant preceding the time interval.

9. The control method according to claim 8, wherein the first instant and the second instant are comprised in the same time interval.

* * * * *